United States Patent [19]

Roe

[11] Patent Number: 5,639,397
[45] Date of Patent: Jun. 17, 1997

[54] METHOD FOR SUPPRESSING DUST EMISSIONS

[75] Inventor: Donald C. Roe, Burlington, N.J.

[73] Assignee: BetzDearborn Inc., Trevose, Pa.

[21] Appl. No.: 635,246

[22] Filed: Apr. 12, 1996

[51] Int. Cl.$^6$ ................................................ C09K 3/22
[52] U.S. Cl. .......................... 252/88.1; 44/602; 427/212; 427/220
[58] Field of Search ........................ 252/88.1, 88.2; 44/602; 404/76; 427/220, 212

[56] References Cited

U.S. PATENT DOCUMENTS

| | | | |
|---|---|---|---|
| Re. 28,474 | 7/1975 | Anderson et al. | 260/29.6 |
| Re. 28,576 | 10/1975 | Anderson et al. | 260/29.6 |
| 3,284,393 | 11/1966 | Vanderhoff et al. | 260/29.6 |
| 3,954,662 | 5/1976 | Salyer et al. | . |
| 4,087,572 | 5/1978 | Nimerick | 427/214 |
| 4,400,220 | 8/1983 | Cole, Jr. | 134/18 |
| 4,551,261 | 11/1985 | Salihar | 427/88 |
| 4,594,268 | 6/1986 | Kirwin | 427/136 |
| 4,780,233 | 10/1988 | Roe | 252/88.1 |
| 4,801,635 | 1/1989 | Zinkan et al. | 524/156 |
| 5,128,178 | 7/1992 | Roe | 427/244 |
| 5,182,331 | 1/1993 | Liao et al. | 525/294 |
| 5,211,854 | 5/1993 | Liao et al. | 210/734 |
| 5,256,444 | 10/1993 | Roe | 427/136 |
| 5,472,675 | 12/1995 | Polizzotti et al. | 423/1 |
| 5,512,636 | 4/1996 | Polizzotti et al. | 525/285 |

*Primary Examiner*—Stephen Kalafut
*Assistant Examiner*—Cephia D. Toomer
*Attorney, Agent, or Firm*—Alexander D. Ricci; Philip H. Von Neida

[57] ABSTRACT

A method for suppressing the dissemination of fugitive dust particles into the atmosphere by using an aqueous solution of a water soluble graft copolymer of the general structure:

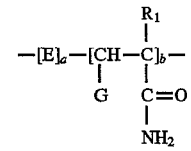

wherein E is the repeat unit obtained after polymerization of an α, β ethylenically unsaturated compound, the molar percentage of a:b is from about 95:5 to 5:95, with the proviso that the sum of a and b equals 100%; G comprises the structure:

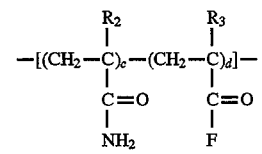

wherein d, $R_1$, $R_2$ and $R_3$ are the same or different and are hydrogen or a lower alkyl group having $C_1$ to $C_3$, F is a salt of an ammonium cation and the molar percentage of c:d is from 95:5 to 5:95 with the proviso that the sum of c and d equals 100%; or an aqueous solution of a water soluble block copolymer of the general structure:

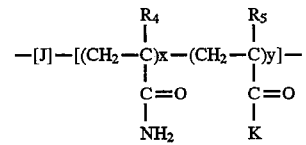

wherein J is a polymeric segment obtained from the polymerization of ethylenically unsaturated hydrophobic monomers initiated by a difunctional initiator; $R_4$ and $R_5$ are H or a $C_1$ to $C_3$ alkyl group; K is a salt of an ammonium cation selected from the group consisting of $NHR_6N^+$ $(R_{7,8,9})^{M-}$ or $OR_6N^+$ $(R_{7,8,9})M^-$, wherein $R_6$ is a $C_1$ to $C_4$ linear or branched alkylene group, and $R_7$, $R_8$ and $R_9$ are selected from the group consisting of hydrogen, $C_1$ to $C_4$ linear or branched alkyl, $C_5$ to $C_8$ cycloalkyl, aromatic or alkylaromatic group; and $M^-$ is an anion, selected from the group consisting of chloride, bromide, methyl sulfate and hydrogen sulfate; and the molar percentage x:y is from about 0:100 to 95:5, with the proviso that the total of x+y equals 100%.

28 Claims, No Drawings

METHOD FOR SUPPRESSING DUST EMISSIONS

FIELD OF THE INVENTION

The present invention relates to methods for suppressing fugitive dust emissions by applying a water soluble graft or block copolymer to dust producing bulk solids.

BACKGROUND OF THE INVENTION

Dust dissemination poses safety, health, and environmental problems in many commercial environments. For instance, in many industries, the transportation handling and storage of bulk solids is common as in industries such as mining, mineral processing, agricultural, power, steel, paper, etc. One major problem associated with bulk solids is dust generation and the control of fugitive dust emissions.

Industrial sources of fugitive dust include open operations, leaks and spills, storage, disposal, transit or poor housekeeping of sundry finely divided solid particulates. The iron and steel industries am replete with examples of the above enumerated categories. Wind erosion of exposed masses of particulate matter such as coal or mine mill tailings, fertilizer, etc. causes both air pollution and economic waste. Detrimental effects on health and cleanliness result where these fine particles are carried aloft by the winds.

A typical method for controlling the dust is to apply a water spray. However, water sprays only control dust for a short period of time depending upon environmental conditions. The application of the spray has to be repeated frequently to provide ongoing dust control.

SUMMARY OF THE INVENTION

The present invention relates to improved methods for controlling fugitive dust emissions from bulk, granular or powdered solids. Fugitive dust emissions are controlled by applying an aqueous solution of a water soluble graft copolymer or water soluble block copolymer to dust producing bulk, granular or powdered solids.

DESCRIPTION OF THE RELATED ART

U.S. Pat. No. 3,954,662 discloses aqueous foamable compositions and their use to suppress coal dust. The composition contains water, an interpolymer of a polymerizable vinyl ester and a partial ester compound interpolymerizable with the vinyl ester, and a detergent wetting agent. The interpolymer binds coal dust and keeps the dust particles encapsulated after the foam as collapsed.

U.S. Pat. No. 4,087,572 discloses a combination of an organic polymer latex such as a styrene-butadiene interpolymer and a silicone applied to the surface of a coal pile or other mass of finely divided particulate materials. In addition, a wetting agent may be incorporated to prevent premature coagulation. The combination is applied as an aqueous mixture such as by spraying.

U.S. Pat. No. 4,551,261 discloses the suppression of dust with an aqueous foam comprising a foaming agent and an elastomeric water insoluble polymer. The foam provides immediate dust suppression and eases application. The polymer coats the material and continues to suppress dust generation during handling of the material after the foam has collapsed.

U.S. Pat. No. 4,594,268 discloses the use of at least one methacrylate polymer for dust suppression. The methacrylate polymer provides dust suppression when applied to a wide variety of materials. After application, the polymer provides a tacky, water resistant coating which effectively prevents dusting while additionally acting as an anti-freeze agent.

U.S. Pat. No. 4,801,635 discloses a combination of water soluble anionic acrylic polymers and nonionic glycol polymers and anionic and nonionic surfactants useful for the control of dust emissions into the environment.

U.S. Pat. No. 4,780,233 discloses a method and composition for controlling fugitive dust particles which comprises an oil containing dust control treatment including a small amount of a water insoluble elastomeric polymer. The inclusion of a small amount of elastomer significantly improves the dust control performance. The composition can be applied as a spray or foam.

U.S. Pat. No. 5,128,178 teaches methods for suppressing the dissemination of fugitive dust particles into the atmosphere from urea with a dust suppressing amount of water, a foaming agent and a water-soluble cationic polymer. The cationic polymer can be a polyamine or polyquaternary ammonium salt, particularly melamine/formaldehyde polymer, diallyldimethyl ammonium chloride polymer, and diethylenetriamine/adipic acid/ epichlorohydrin polymer. U.S. Pat. No. 5,256,444 teaches methods for suppressing fugitive dust dissemination from a dust producing material comprising contacting the material with an aqueous foam solution comprising an anionic foaming agent and a water soluble cationic polymer.

DETAILED DESCRIPTION OF THE INVENTION

The present invention relates to methods for suppressing the dissemination of fugitive dust particles into the atmosphere from dust producing materials comprising applying to the dust producing materials an aqueous solution of water soluble graft copolymer or block copolymer.

Specifically, the graft polymers in the invention contain polymeric segments obtained from the polymerization of acrylamide and cationic monomers which are attached or "grafted" to another polymer chain which is comprised of the repeating units of one or more monomers. The resulting graft copolymers are soluble in an aqueous medium.

The graft copolymer of the invention has the general structure:

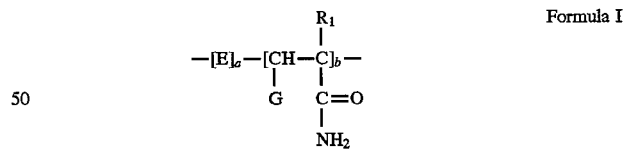

Formula I wherein E in the above formula (Formula I) is the repeat unit obtained after polymerization of an $\alpha$, $\beta$ ethylenically unsaturated compound, preferably carboxylic acid, amide form thereof, alkyl (C1–C8) ester or hydroxylated alkyl (C1–C8) ester of such carboxylic acid. Compounds encompassed by E include the repeat unit obtained after polymerization of acrylamide, methacrylamide, acrylic acid, methacrylic acid, maleic acid or anhydride, styrene sulfonic acid, 2-acrylamido-2-methylpropyl sulfonic acid, itaconic acid, and the like. Ester derivatives of the above mentioned acids such as 2-hydroxypropyl acrylate, methyl methacrylate, and 2-ethylhexyl acrylate, are also within the purview of the invention.

The molar percentage of a:b is from about 95:5 to 5:95, with the proviso that the sum of a and b equals 100%.

G in the above formula (Formula I) is a polymeric segment comprising repeat units having the structure:

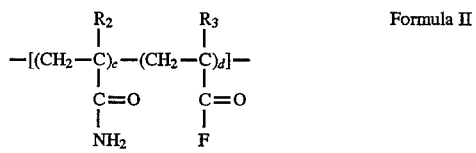

Formula II wherein $R_1$, $R_2$ and $R_3$ in Formulae I and II are the same or different and are hydrogen or a lower alkyl group having $C_1$ to $C_3$. F in the above formula is a salt of an ammonium cation, such as $NHR_3N^+R_{(4,5,6)}M^-$ or $OR_3N^+R_{(4,5,6)}M^-$, wherein $R_3$ is a $C_1$ to $C_4$ linear or branched alkylene group, and $R_4$, $R_5$ and $R_6$ can be selected from the group consisting of hydrogen, $C_1$ to $C_4$ linear or branched alkyl, $C_5$ to $C_8$ cycloalkyl, aromatic or alkylaromatic group; and M is an anion, such as chloride, bromide, or methyl or hydrogen sulfate. Typical cationic monomers are 2-acryloyloxyethyltrimethylammonium chloride (AETAC), 3-(meth)acrylamidopropyltrimethylammonium chloride (MAPTAC or APTAC), 2-methacryloyloxyethyltrimethylammonium chloride (METAC) and diallyldimethylammonium chloride (DADMAC), etc.

It is to be understood that more than one kind of cationic monomer may be present in Formula II.

The molar percentage of c:d in Formula II may vary from 95:5 to 5:95, with the proviso, however, that the sum of c and d equals 100%.

There is no limit to the kind and mole percent of the monomers chosen so long as the total adds up to 100 mole % and the resulting copolymers are water soluble.

At present, the preferred water soluble graft copolymer for use as a dust control agent is:

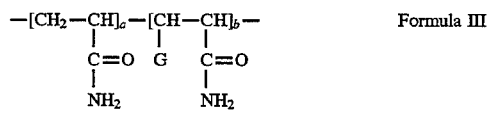

Formula III

The molar percentage of a:b is from about 95:5 to 5:95, with the proviso that the sum of a and b equals 100%. G in Formula III is:

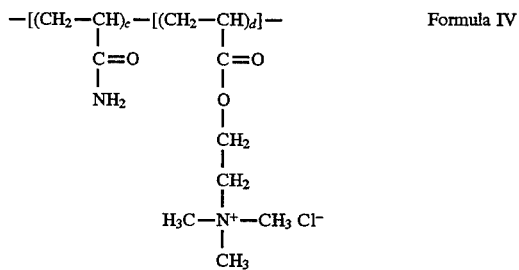

Formula IV

The cationic monomer d is 2-acryloyloxyethyltrimethylammonium chloride (AETAC). The molar percentage of c:d in the polymer segment G (Formula IV) is the ratio of acrylamide:AETAC. It may fall within the range between 95:5 and 5:95. The sum of c and d must add up to 100%. Preferably, the number average molecular weight will be within the range of 5,000 to 500,000, with the range of about 10,000 to about 200,000 being even more desirable. The key criterion is that the resulting graft copolymer be water soluble.

The number average molecular weight ($M_n$) of the polymeric segment G is not critical and may fall within the range of 1,000 to 1,000,000. The graft copolymer has a number average molecular weight of from about 10,000 to 30,000,000, preferably, from about 1,000,000 to 30,000,000.

The method of preparing the water soluble graft copolymer used in this invention is disclosed in U.S. Pat. No. 5,211,854, herein wholly incorporated by reference.

Block Copolymers

The block copolymers of the invention useful for dust control contain a polymeric segment obtained from polymerization of hydrophobic or water insoluble monomers attached to a polymer chain obtained from polymerization of one or more water soluble monomers. The resulting block copolymers are water soluble.

The block copolymers of the present invention have the general structure:

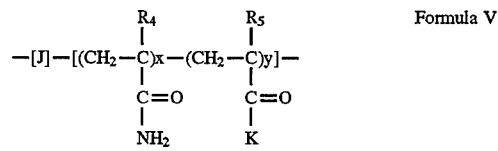

Formula V wherein J is a polymeric segment obtained from the polymerization of hydrophobic or water insoluble monomers. Examples of such monomers include alkyl acrylamides, alkyl methacrylamides, alkyl acrylates, alkyl methacrylates, and alkylstyrenes. Preferably, the hydrophobic monomer is an alkyl acrylate having 4 to about 16 carbon atoms in the alkyl group such as 2-ethylhexyl acrylate. Other suitable hydrophobic or water insoluble monomers include the higher alkyl esters of ethylenically unsaturated carboxylic acids such as alkyl dodecyl acrylate, dodecyl methacrylate, tridecyl acrylate, tridecyl methacrylate, octadecyl acrylate, octadecyl methacrylate, ethyl half ester of maleic anhydride, diethyl maleate, and other alkyl esters derived from the reactions of alkanols having from 8 to 20 carbon atoms with ethylenically unsaturated carboxylic acids such as acrylic acid, methacrylic acid, maleic anhydride, fumaric acid, itaconic acid and aconitic acid, alkylaryl esters of ethylenically unsaturated carboxylic acids such as nonyl-α-phenyl acrylate, nonyl-α-phenyl meth dodecyl-α-phenyl acrylate and dodecyl-α-phenyl methacrylate; N-alkyl, ethylenically unsaturated amides such as N-octadecyl acrylamide, N-octadecyl methacrylamide, N,N-dioctyl acrylamide and similar derivatives thereof; vinyl alkylates wherein alkyl has at least 8 carbons such as vinyl laurate and vinyl stearate, vinyl alkyl ethers such as dodecyl vinyl ether and hexadecyl vinyl ether; N-vinyl amides such as N-vinyl lauramide and N-vinyl stearamide; and aralkylstyrenes such as t-butyl styrene. Of the foregoing hydrophobic monomers, the alkyl esters of acrylic acid and methacrylic acid wherein alkyl has from 4 to 16 carbon atoms, are preferred. The hydrophobic polymers are not water soluble and can be prepared by precipitation or emulsion polymerization techniques.

Monomer x, when present, in the Formula V is a nonionic monomer such as acrylamide or alkylacrylamide. $R_4$ and $R_5$ is H or a lower alkyl group having $C_1$ to $C_3$. Monomer y is a cationic monomer. K in the above formula is a salt of an ammonium cation, such as $NHR_6^{N+}$ $(R_{7,8,9})^{M-}$ or $OR_6^{N+}$ $(R_{7,8,9})^{M-}$, wherein $R_6$ is a $C_1$ to $C_4$ linear or branched alkylene group, and $R_7$, $R_8$ and $R_9$ can be selected from the group consisting of hydrogen, $C_1$ to $C_4$ linear or branched alkyl, $C_5$ to $C_8$ cycloalkyl, aromatic or alkylaromatic group; and $M^-$ is an anion, such as chloride, bromide, or methyl or hydrogen sulfate. Typical cationic monomers are 2-acryloxyethyltrimethyl ammonium chloride (AETAC), 3-methacrylamidopropyltrimethyl ammonium chloride (MAPTAC), 2-methacryloxyethyltrimethyl ammonium chloride (METAC) and diallyl dimethyl ammonium chloride (DADMAC), etc.

The molar percentage x:y of nonionic monomer:cationic monomer, may fall within the range of between 0:100 to 95:5. The molar percentages of x and y must add up to 100%. It is to be understood that more than one kind of cationic monomer may be present in the Formula V.

At present, the preferred water soluble block copolymer is:

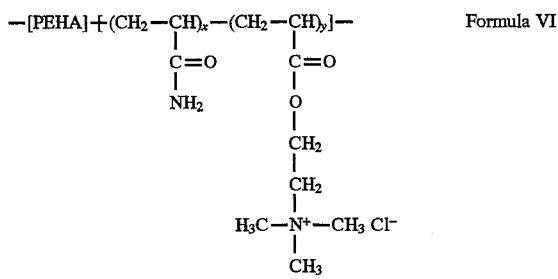

Formula VI wherein PEHA is poly(2-ethylhexyl acrylate) obtained from polymerization of 2-ethylhexyl acrylate (EHA) initiated by a diperoxide initiator, 2,5-dihydroperoxy-2,5-dimethylhexane (Luperox 2,5-2,5, Pennwalt). The resulting poly(EHA) is water insoluble and has a hydrophobic nature. The number average molecular weight (Mn) of poly(EHA) may fall within the range of 500 to 1,000,000. Preferably, the number average molecular weight will be within the range of 1,000 to 500,000, with the range of about 5,000 to about 200,000 being even more desirable. The key criterion is that the resulting block copolymer be water soluble. Since the diperoxide initiator is used to initiate EHA, the resulting poly(EHA) still contains peroxide for further reaction. It is then copolymerized with monomers x and y to form a block copolymer.

In this invention, the preferred monomer x is acrylamide and monomer y is 2-acryloxyethyltrimethyl ammonium chloride (AETAC). The molar percentage of x:y is from about 0:100 to 95:5, with the molar percentage of from about 10:90 to 75:25 being preferred. The block copolymers are prepared by a water-in-oil emulsion technique. Such processes have been disclosed in U.S. Pat. No. 3,284,393, Reissue U.S. Pat. No. 28,474 and U.S. Pat. No. Re. 28,576, herein incorporated by reference. The resulting copolymers may also be further isolated by precipitating in an organic solvent such as acetone and dried to a powder form. The powder can be easily dissolved in an aqueous medium for use in desired applications.

Branching agents such as polyethyleneglycol di(meth) acrylate, methylene bis(meth)acrylamide, N-vinyl acrylamide, allyl glycidyl ether, glycidyl acrylate and the like may also be added, providing the resulting block copolymer is water soluble. It is to be understood that the aforementioned polymerization methods do not in any way limit the synthesis of polymers according to this invention. Any of the well known chain transfer agents familiar to those skilled in the art may be used to control the molecular weight. Those include, but are not limited to, lower alkyl alcohols such as isopropanol, amines, mercaptans, phosphites, thioacids, allyl alcohol and the like.

The structure of the block copolymer is substantiated by a conventional solution viscosity and $C^{13}$ NMR spectroscopy. The molecular weight of the resulting block copolymer is not critical, as long as it is soluble in water.

The method of preparing the water soluble block copolymer used in this invention is disclosed in U.S. Pat. No. 5,182,331, herein wholly incorporated by reference.

The water soluble graft and block copolymers of the present invention may be applied to the dust producing material (substrate) by either spraying as a liquid onto the substrate or by applying as a foam which incorporates an effective surfactant-based foaming agent. The liquid spray incorporates a suitable solvent for the copolymers which is preferably aqueous. The foam incorporates a suitable solvent for the copolymers, preferably aqueous, and a suitable gas which is preferably air.

Aqueous solutions of 0.1 to 10.0% polymer can be sprayed or foamed onto the substrate. The feed rate of sprayed aqueous solution ranges from about 0.1 to about 10.0 gallons of solution per ton of substrate. Preferably, 0.5 to about 5.0 gallons per ton of substrate are applied by spraying. When applied as a foam, the copolymers are fed in a ranges from about 0.05 to about 5.0 gallons of foamed solution per ton of substrate. Preferred foam feed rates range from about 0.25 to about 2.5 gallons of foamed solution per ton of dust producing material. The foam for the dust control treatment may be foamed and applied via conventional techniques such as those disclosed in U.S. Pat. No. 4,400,220 (Cole), the contents of which are hereby incorporated by reference.

The copolymers of the instant invention are suitable for use on any material prone to create dust, which include but are not limited to rock, green and calcined petroleum coke, ores (for example, iron ore), grains, limestone, gypsum, fly ash, cement clinker, steel mill sinter, coal, bauxite, fertilizers (such as potash and phosphates), metallurgical coke dust, basic oxygen furnace dust and road dust.

The copolymers of the instant invention may also be used with other additives for improved dust control. In addition to acting as foaming agents, anionic, nonionic and/or cationic surfactants may be employed to improve the wetting properties of the copolymer solutions.

In order to more clearly illustrate this invention, the data set forth below was developed. The following examples are included as being illustrations of the invention and should not be construed as limiting the scope thereof.

EXAMPLES

Table I herein below summarizes the descriptions of graft and block copolymers utilized in the experimental dust testing.

TABLE I

| Treatments | Trade Name | Description |
|---|---|---|
| A | Betz Polymer 2666 | Block, 50% cationic |
| B | Betz Polymer 2672 | Graft, 5% cationic |
| C | Betz Polymer 2674 | Graft, 10% cationic |
| D | Betz Polymer 2676 | Graft, 20% cationic |

In order to demonstrate the efficacy of the graft and block copolymers at inhibiting dust emissions, a series of laboratory tests were undertaken.

The substrate tested was minus ¼ inch sub-bituminous coal substrate. All treatments of the graft and block copolymers were applied as 0.25% active solutions at a rate of 10 gal/ton of coal.

The treated coal samples were allowed to dry for 48 hours to determine residual (long-term) dust control effects compared to control samples (coal treated with water). Relative dustiness measurements were made using a laboratory dust chamber (modified ASTM dust box). Percent dust suppression (% DS) was calculated based on the relative dustiness number (RDN) of the control versus treated samples as follows:

% DS=control RDN−treated RDN×100 control RDN

All RDN values were measured in triplicate; the average RDN value was used for the % DS calculation. Test results are reported in Table II.

TABLE II

| Treatment | % Dust Suppression |
| --- | --- |
| A | 81 |
| B | 84 |
| C | 77 |
| D | 79 |

As Table I indicates, the coal samples treated with the copolymers of the instant invention were significantly less dusty than the control indicating the effectiveness of the copolymers of the present invention at suppressing dust emissions.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

Having thus described the invention, what I claim is:

1. A method for suppressing the dissemination of fugitive dust particles into the atmosphere from dust producing materials comprising applying to said dust producing materials a sufficient amount for the purpose of an aqueous solution of a water soluble graft copolymer having the formula:

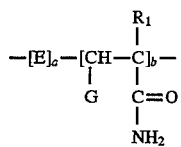

wherein E is the repeat unit obtained after polymerization of an α, β ethylenically unsaturated compound, the molar percentage of a:b is from about 95:5 to 5:95 with the proviso that the sum of a and b equals 100%; G comprises the structure:

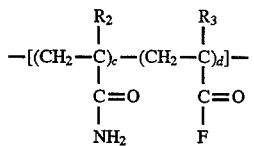

wherein, $R_1$, $R_2$ and $R_3$ are the same or different and are hydrogen or a lower alkyl group having $C_1$ to $C_3$, F is a salt of an ammonium cation and the molar percentage of c:d is from 95:5 to 5:95 with the proviso that the sum of c and d equals 100%.

2. The method as claimed in claim 1 wherein the α, β ethylenically unsaturated compound is selected from the group consisting of a carboxylic acid, the amide form thereof, the alkyl ($C_1$-$C_8$) ester thereof, and ethylenically unsaturated sulfonic acid the hydroxylated alkyl ($C_1$-$C_8$) thereof.

3. The method as claimed in claim 2 wherein the α, β ethylenically unsaturated compound is selected from the group consisting of acrylamide, methacrylamide, acrylic acid, methacrylic acid, maleic acid, maleic anhydride, styrene sulfonic acid, 2-acrylamido-2-methyl propyl sulfonic acid, itaconic acid, 2-hydroxylpropyl acrylate, methyl methacrylate and 2-ethylhexyl acrylate.

4. The method as claimed in claim 1 wherein F is selected from the group consisting of $NHR_3N^+R_{(4,5,6)}{}^{M-}$ or $OR_3N^+R_{(4,5,6)}M^-$, wherein $R_3$ is a $C_1$ to $C_4$ linear or branched alkylene group, and $R_4$, $R_5$ and $R_6$ are selected from the group consisting of hydrogen, $C_1$ to $C_4$ linear or branched alkyl, $C_5$ to $C_8$ cycloalkyl, aromatic and alkylaromatic group; and $M^-$ is an anion selected from the group consisting of chloride, bromide, methyl sulfate and hydrogen sulfate.

5. The method as claimed in claim 1 wherein said graft copolymer has the structure:

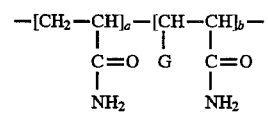

wherein the molar percentage of a:b is from about 95:5 to 5:95, with the proviso that the sum of a and b equals 100%, and G has the structure:

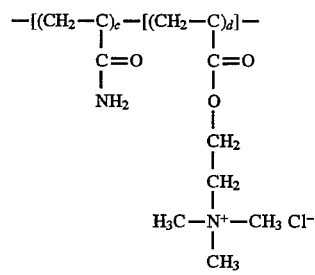

6. The method as claimed in claim 1 wherein the number average molecular weight of G is from about 1,000 to about 1,000,000.

7. The method as claimed in claim 6 wherein the number average molecular weight of G is from about 5,000 to about 500,000.

8. The method as claimed in claim 7 wherein the number average molecular weight of G is from about 10,000 to about 200,000.

9. The method as claimed in claim 1 wherein the graft copolymer has a number average molecular weight of from about 10,000 to 30,000,000.

10. The method as claimed in claim 9 wherein the graft copolymer has a number average molecular weight of from about 1,000,000 to 30,000,000.

11. The method as claimed in claim 1 wherein said aqueous solution contains from about 0.1 to about 10.0% graft copolymer.

12. The method as claimed in claim 1 wherein said graft copolymer solution is sprayed onto said dust producing materials in an amount from about 0.1 to about 10.0 gallons per ton of said dust producing materials.

13. The method as claimed in claim 1 wherein said graft copolymer solution is applied as a foam to said dust producing materials in an amount from about 0.05 to about 5.0 gallons of foamed solution per ton of said dust producing materials.

14. The method as claimed in claim 1 wherein said graft copolymer is added to said dust producing material with surfactant foaming agents.

15. The method as claimed in claim 1 wherein said graft copolymer is added to said dust producing material with surfactant wetting agents.

16. A method for suppressing the dissemination of fugitive dust particles into the atmosphere from dust producing materials comprising applying to said dust producing materials a sufficient amount for the purpose of an aqueous solution of a water soluble block copolymer having the formula:

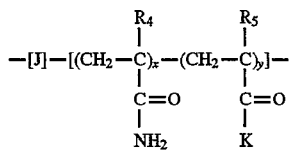

wherein J is a polymeric segment obtained from the polymerization of ethylenically unsaturated hydrophobic monomers initiated by a difunctional initiator; $R_4$ and $R_5$ are H or a $C_1$ to $C_3$ alkyl group; K is a salt of an ammonium cation selected from the group consisting of $NHR_6N^+(R_{7,8,9})^{M-}$ or $OR_6N^+(R_{7,8,9})^{M-}$, wherein $R_6$ is a $C_1$ to $C_4$ linear or branched alkylene group, and $R_7$, $R_8$ and $R_9$ are selected from the group consisting of hydrogen, $C_1$ to $C_4$ linear or branched alkyl, $C_5$ to $C_8$ cycloalkyl, aromatic and alkylaromatic group; and $M^-$ is an anion selected from the group consisting of chloride, bromide, methyl sulfate and hydrogen sulfate; and the molar percentage of x:y is from about 0:100 to 95:5, with the proviso that the total of x+y equals 100%.

17. The block copolymers as claimed in claim 16 wherein the ethylenically unsaturated hydrophobic monomer is selected from the group consisting of alkyl acrylate having from 4 to about 16 carbon atoms, the higher alkyl esters of ethylenically unsaturated carboxylic acids, alkaryl esters of ethylenically unsaturated carboxylic acids, N-alkyl ethylenically unsaturated amides, vinyl alkylates wherein the alkyl moiety has at least 8 carbon atoms, N-vinyl amides and aralkylstyrenes.

18. The block copolymers as claimed in claim 17 wherein the alkyl acrylate is 2-ethylhexyl acrylate.

19. The block copolymers as claimed in claim 17 wherein $R_4$ is H.

20. The block copolymers as claimed in claim 19 wherein $R_4$ is H or methyl and K is selected from the group consisting of oxyethyltrimethyl ammonium chloride and amidopropyl trimethyl ammonium chloride.

21. The block copolymers as claimed in claim 16 wherein the number average molecular weight of J is about 500 to 1,000,000.

22. The block copolymers as claimed in claim 21 wherein the number average molecular weight of J is about 1,000 to 500,000.

23. The block copolymers as claimed in claim 22 wherein the number average molecular weight of J is about 5,000 to 200,000.

24. The method as claimed in claim 16 wherein said aqueous solution contains from about 0.1 to about 10.0% graft copolymer.

25. The method as claimed in claim 16 wherein the water soluble block copolymer solution is sprayed onto said dust producing materials in an amount from about 0.1 to about 10.0 gallons per ton of said dust producing materials.

26. The method as claimed in claim 16 wherein the water soluble block copolymer solution is applied as a foam to said dust producing materials in an amount ranging from about 0.05 to about 5.0 gallons of foamed solution per ton of said dust producing materials.

27. The method as claimed in claim 16 wherein said water soluble block copolymer is added to said dust producing material with surfactant foaming agents.

28. The method as claimed in claim 16 wherein said water soluble block copolymer is added to said dust producing material with surfactant wetting agents.

* * * * *